United States Patent
Carucci et al.

(10) Patent No.: US 10,589,637 B2
(45) Date of Patent: Mar. 17, 2020

(54) RETENTION ASSEMBLY FOR A VEHICLE WIRELESS CHARGING STATION

(71) Applicant: Lear Corporation, Southfield, MI (US)

(72) Inventors: Anthony Carucci, Shelby Township, MI (US); William J. Hayes, Hendersonville, NC (US); Drew Iziel, Pensacola, FL (US); Aribert Neumann, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 110 days.

(21) Appl. No.: 16/047,191

(22) Filed: Jul. 27, 2018

(65) Prior Publication Data

US 2020/0031236 A1    Jan. 30, 2020

(51) Int. Cl.
| | |
|---|---|
| *B60L 53/30* | (2019.01) |
| *H02J 7/00* | (2006.01) |
| *B60L 53/31* | (2019.01) |
| *B60L 53/12* | (2019.01) |
| *H02J 7/02* | (2016.01) |

(52) U.S. Cl.
CPC ............... *B60L 53/31* (2019.02); *B60L 53/12* (2019.02); *B60L 53/30* (2019.02); *H02J 7/025* (2013.01)

(58) Field of Classification Search
CPC ....................................................... H02J 7/025
USPC ....................................................... 320/108
See application file for complete search history.

(56) References Cited

U.S. PATENT DOCUMENTS

| | | |
|---|---|---|
| 4,039,206 A | 8/1977 | Nault |
| 4,282,995 A | 8/1981 | Austin |
| 5,288,049 A | 2/1994 | Hays |
| 5,950,973 A | 9/1999 | Verma |
| 6,123,301 A | 9/2000 | Schroeder et al. |
| 6,826,045 B2 | 11/2004 | Chen |
| 7,857,567 B2 | 12/2010 | Iwata et al. |
| 8,739,585 B2 | 6/2014 | Sims |
| 10,135,287 B2 * | 11/2018 | Yuasa .................... B60R 16/02 |
| 2015/0061582 A1 * | 3/2015 | Tatsuta ................. B60L 53/305 320/108 |

FOREIGN PATENT DOCUMENTS

EP          1769970 A1     4/2007

* cited by examiner

*Primary Examiner* — Edward Tso
*Assistant Examiner* — Ahmed H Omar
(74) *Attorney, Agent, or Firm* — Brooks Kushman P.C.

(57) ABSTRACT

A retention assembly for a charging station for a vehicle is provided. The assembly has a ground latch bracket to receive a cover latch bracket extending from a cover of a charging pad. The assembly also has a locking mechanism with a ground locking bracket to mount to the ground surface, a support bracket to connect to the cover, and a sliding bracket. The sliding bracket translates relative to the support bracket to lock and unlock the locking mechanism with inclined flanges of the ground locking bracket mating with inclined flanges of the support bracket and sliding bracket when the locking mechanism is in a locked position. A charging assembly having a retention assembly, and a method of positioning the charging station is also provided.

20 Claims, 4 Drawing Sheets

US 10,589,637 B2

RETENTION ASSEMBLY FOR A VEHICLE WIRELESS CHARGING STATION

TECHNICAL FIELD

Various embodiments relate to a retention assembly for a charging assembly for charging a vehicle.

BACKGROUND

Vehicles such as hybrid vehicle or electric vehicles may require charging or recharging of a traction battery at a charging station. A wireless charging station may be used where the vehicle is wirelessly charged using inductive charging with the vehicle positioned above the charging pad on a ground surface.

SUMMARY

In an embodiment, an assembly for charging a vehicle is provided with a ground latch bracket to mount to a ground surface, a charging pad contained within a cover, and a cover latch bracket supported by a lower surface of the cover, to translate relative to the ground latch bracket to an engaged position. A portion of the ground latch bracket is positioned between the cover latch bracket and the lower surface of the cover in the engaged position to prevent movement of the charging pad in a direction perpendicular to the ground surface. The assembly has a locking mechanism with a ground locking bracket with a ground plate extending between first and second inclined flanges, with the ground plate to mount to the ground surface. The locking mechanism has a support bracket with a third inclined flange extending from a support plate, with the support plate supported by the lower surface of the cover and the support plate having first and second guide members extending therefrom. The locking mechanism has a sliding bracket with a fourth inclined flange extending from a sliding plate, with the sliding plate received for translation by the first and second guide members. The sliding bracket translates relative to the support bracket to lock and unlock the locking mechanism, wherein the third inclined flange mates with the first inclined flange and the fourth inclined flange mates with the second inclined flange when the locking mechanism is in a locked position to prevent movement of the charging pad in the direction perpendicular to the ground surface.

In another embodiment, a retention assembly for a charging station for a vehicle is provided with a ground latch bracket to mount to a ground surface and receive a cover latch bracket extending from a lower surface of a cover of a charging pad. The ground latch bracket is positioned between the cover latch bracket and the lower surface in an engaged position. A locking mechanism is provided with a ground locking bracket with a ground plate extending between first and second inclined flanges, with the ground plate to mount to the ground surface. The locking mechanism also has a support bracket and a sliding bracket. The support bracket has a third inclined flange extending from a support plate, with the support plate to connect to the lower surface of the cover and=having first and second guide members extending therefrom. The sliding bracket has a fourth inclined flange extending from a sliding plate, with the sliding plate received for translation by the first and second guide members such that the sliding bracket translates relative to the support bracket to lock and unlock the locking mechanism. The third inclined flange mates with the first inclined flange and the fourth inclined flange mates with the second inclined flange when the locking mechanism is in a locked position.

In yet another embodiment, a method of positioning an assembly for charging an vehicle is provided. A ground latch bracket is provided on a surface plate. A locking mechanism is provided in an engaged position on the surface plate. The locking mechanism has a ground locking bracket connected to the surface plate with first and second inclined flanges, a support bracket with a third inclined flange, and a sliding bracket received for translation by the support bracket with a fourth inclined flange, with the third and fourth inclined flanges mated with the first and second inclined flanges in the engaged position, respectively, to prevent movement of the support bracket in a direction perpendicular to the surface plate. Adhesive is applied to an upper surface of the support bracket. The surface plate is attached to an underlying ground surface. A charging pad is laterally translated relative to the surface plate such that a cover latch bracket extending from the charging pad is inserted between the ground latch bracket and the surface plate thereby preventing movement of the charging pad in the direction perpendicular to the surface plate. The charging pad is lowered such that a lower surface of the charging pad adheres to the upper surface of the support bracket of the locking mechanism.

In yet another embodiment, a method of uninstalling a charging pad is provided. A sliding bracket of a locking mechanism connecting the charging pad to a ground surface is translated relative to a support bracket such that the locking mechanism is in a disengaged position with third and fourth inclined flanges of the support and sliding brackets, respectively, are spaced apart from the first and second inclined flanges of a ground locking bracket connected to the ground surface. The charging pad is lifted such that the ground locking bracket is spaced apart from the support bracket and sliding bracket. The charging pad is laterally translated relative to the surface plate such that a cover latch bracket extending from the charging pad is withdrawn from between the ground surface and a ground latch bracket connected to the ground surface.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
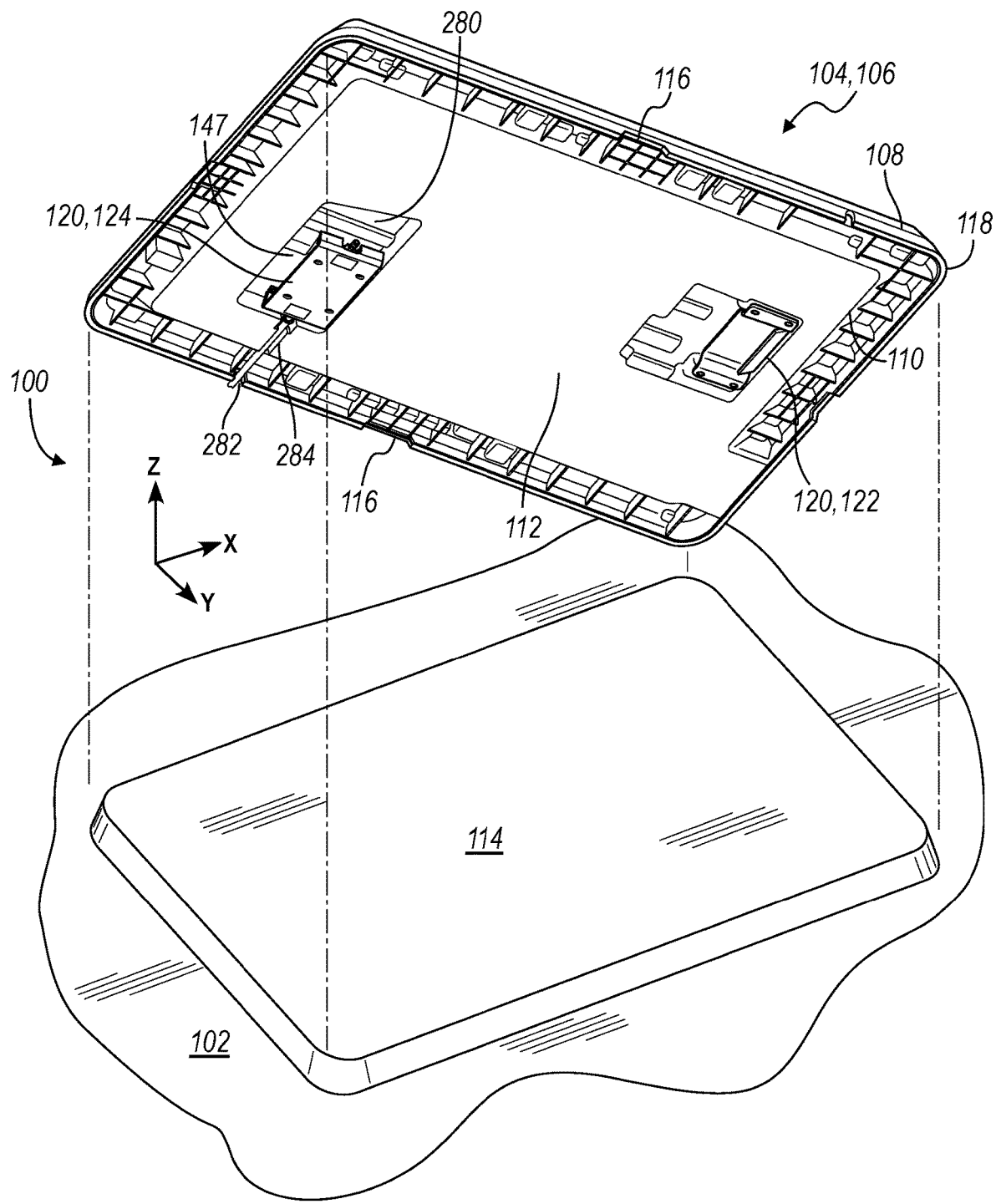
FIG. 1 is a perspective exploded schematic view of an assembly for charging an electric vehicle.

FIG. 1 illustrates an assembly 100 for charging or recharging a vehicle such as an electric vehicle or hybrid vehicle with a traction battery. The charging may be wireless such as inductive charging. The assembly 100 is supported on an underlying surface or ground surface 102. A base charging pad 104, or charging pad, is contained within a cover 106. In one example the cover 106 has an upper cover 108 and a lower cover 110 with a lower surface 112. The base charging pad 104 includes a wireless transmitter to communicate with a wireless receiver mounted in a vehicle when the vehicle is positioned over the assembly for inductive charging of the traction battery.

In one example, the cover 106 may be mounted directly to the ground surface 102. In another example, and as shown, the cover 106 is positioned onto a surface plate 114 on the ground surface 102. The surface plate 114 may be connected to the ground surface 102, for example, using an adhesive, various fasteners, or the like.

The cover 106 may have one or more handles 116 to aid in moving and positioning the base pad 104 relative to the surface plate 114. The cover 106 may additionally have an outer peripheral rim 118 or lip that extends towards the ground surface 102 and surrounds the surface plate 114.

The assembly 100 may be used in various installations, including in a personal garage, in a parking structure, in a parking lot, and the like. In order to the prevent the assembly 100 from being moved or dislodged from its desired position, e.g. within a specified region of a parking space or other vehicle charging location, a retention assembly 120 is provided according to the present disclosure. The retention assembly 120 acts to retain or secure the charging base pad 104 and cover 106 to the ground surface or surface plate. The retention assembly 120 may further act as a theft deterrent when the assembly is used in a public location.

The retention assembly 120 has a latching mechanism 122 and a locking mechanism 124. The latching mechanism 122 and the locking mechanism 124 cooperate to retain the cover 106 and charging base pad to the surface plate 114. The latching mechanism 122 and locking mechanism 124 also allow for removal of the cover 106 and base pad from the surface plate 114, for example, for maintenance of the charging base pad or other components within the cover, or for relocation of the assembly 100. The base charging pad is secured to the ground surface or surface plate when the latch mechanism 122 is the engaged position and the locking mechanism 124 is in the locked position. With the latch mechanism 122 in the engaged position and the locking mechanism 124 in the locked position, movement of the base charging pad is constrained in at least three degrees of translational freedom or motion, e.g. the base charging pad cannot translate or move along the x-, y-, or z-axes. The base charging pad may be further constrained in three degrees of rotational freedom or motion such that the base charging pad cannot rotate about each of the x-, y-, or z-axes.

Figure 2:
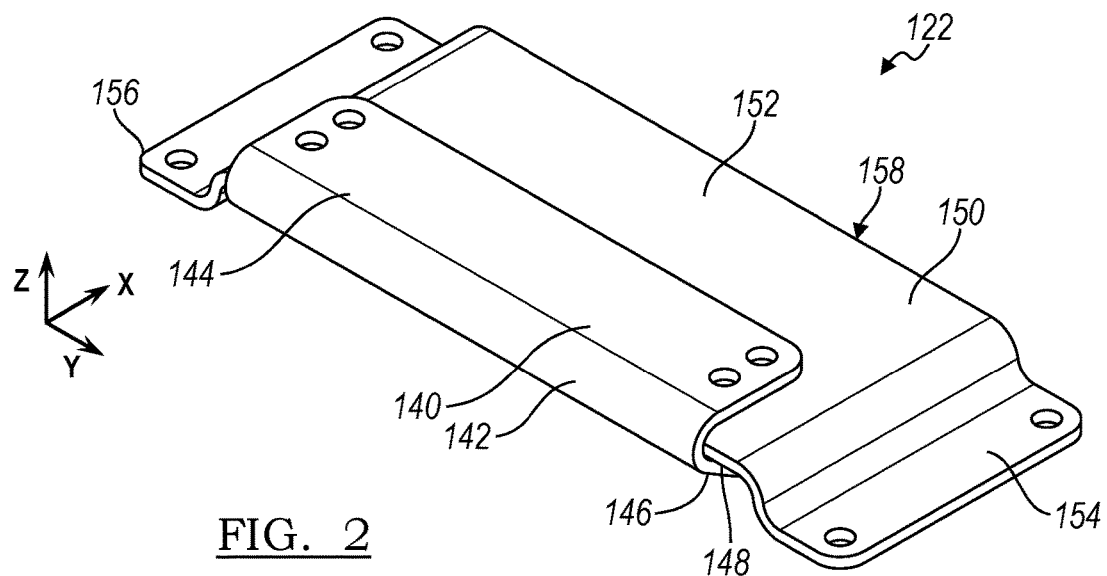
FIG. 2 is a perspective view of a cover latch bracket and ground bracket for a retention assembly according to an embodiment.

FIG. 2 illustrates a latching mechanism 122 according to an example, and for use with the assembly of FIG. 1. The latching mechanism 122 has a cover latch bracket 140 supported by or extending from a lower surface 112 of the cover 106. The cover latch bracket 140 may be the attached and fixed relative to the lower surface 112 of the cover. In various examples, the cover latch bracket 140 may be attached to the lower surface 112 of the cover using an adhesive, welding, or various fasteners.

The cover latch bracket 140 has an intermediate member 142 positioned between and connecting first and second legs 144, 146, with one of the first and second legs 144 connected to the lower surface 112 of the cover, and the other of the legs 146 being a distal free end. The leg 146 defines an upper face 148, or face 148 that faces the lower surface 112 of the cover. The leg 146 may be provided as a tab or other flat plate member with the upper face 148 that extends substantially parallel with the ground surface 102 when the cover 106 is attached to the surface plate 114. Substantially as used herein refers to within five to ten degrees of the described geometric relationship. The cover latch bracket 140 may additionally be defined as being U-shaped.

The latching mechanism 122 also has a ground latch bracket 150 to mount to the ground surface or surface plate. The ground latch bracket 150 may be attached to the surface plate 114 using an adhesive, welding, or various fasteners. In other examples, the mechanism may be reversed such that the bracket 150 is attached to the surface 112 of the cover while the bracket 140 is attached to the surface plate 114.

The ground latch bracket 150 has a central plate portion 152 with opposite end regions 154, 156 for connection to the ground surface or surface plate. The end regions or mounting flanges 154, 156 elevate the central plate portion 152 above the surface plate 114 such that the central plate portion is spaced apart from the surface plate 114. The central plate portion 152 of the ground latch bracket has a lower face 158 that extends substantially parallel with the surface plate and ground surface. When the latching mechanism is in the engaged position as shown, the central plate portion 152 is received between the first and second legs 144, 146 of the cover latch bracket 140. The upper face of the leg 146 and the lower face 158 of the ground latch bracket face one another in the engaged position, and may interface, mate, or otherwise contact one another if the cover 106 is moved in the z-direction or vertically when the latch mechanism 122 is engaged.

The cover 106 may be translated or moved laterally relative to the surface plate 114 such that the cover latch bracket 140 translates along the (x) direction relative to the ground latch bracket 150 into an engaged position with the central plate portion 152 received between the legs 144, 146. Therefore, a portion 152 of the ground latch bracket is positioned between the cover latch bracket 140 and the lower surface 112 of the cover in the engaged position to prevent movement of the base charging pad in a direction (z) perpendicular to the ground surface 102, or in a vertical direction.

The cover latch bracket 140 may be positioned within a recessed pocket 147 defined by the lower surface 112 of the cover, with the ground latch bracket 150 also being received within the pocket 147 when the latching mechanism 122 is in an engaged position as shown in FIG. 2.

A length of the cover latch bracket 140 in the y-direction is less than a length of the central plate portion 152 in the y-direction. Furthermore, the width of the leg 146 in the x-direction may be less than a width of the central plate portion 152 in the y-direction as shown. The brackets 140, 150 may be formed from metal, a metal alloy, or a plastic material.

Figure 3:
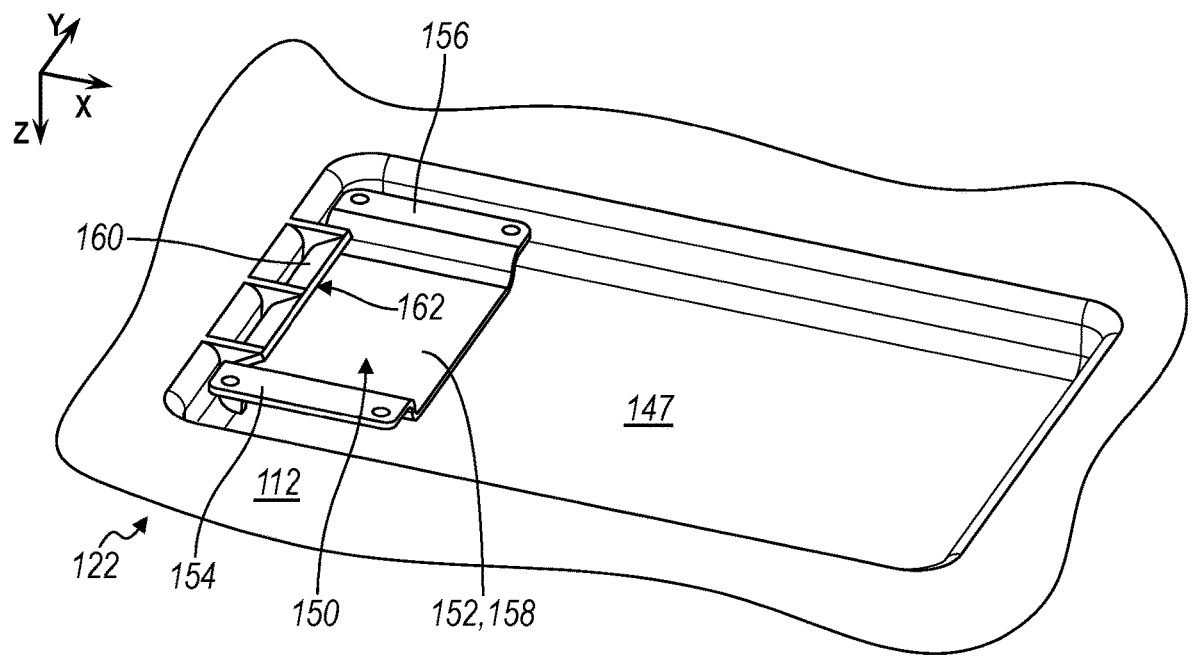
FIG. 3 is a perspective view of a cover latch bracket and ground bracket for a retention assembly according to another embodiment.

FIG. 3 illustrates a latching mechanism 122 according to another example, and for use with the assembly 100 of FIG.

1. Elements that are the same as or similar to those described above with reference to FIG. 2 are given the same reference number for simplicity.

In FIG. 3, the latching mechanism 122 has a cover latch bracket 160 that is integrally formed with the cover 106. The cover latch bracket 160 extends outwardly from the lower surface 112 of the cover within or adjacent to the pocket 147. The cover latch bracket 160 may be formed with the lower cover member during a molding or other forming process. The cover latch bracket 160 may be provided as a tab as shown, and is received between the central plate portion 152 of the ground latch bracket 150 and the ground surface 102 in the engaged position.

The cover latch bracket 160 has an upper face 162 that extends substantially parallel with the ground surface 102 when the cover 106 is attached to the surface plate 114. The upper face 162 and the lower face 158 of the ground latch bracket face one another in the engaged position, and may interface, mate, or otherwise contact one another if the cover 106 is moved in the z-direction or vertically when the latch mechanism 122 is engaged.

A length of the cover latch bracket 160 in the y-direction is less than a length of the central plate portion 152 in the y-direction. Furthermore, the width of the bracket 160 in the x-direction may be less than a width of the central plate portion 152 in the y-direction as shown.

Figure 4:
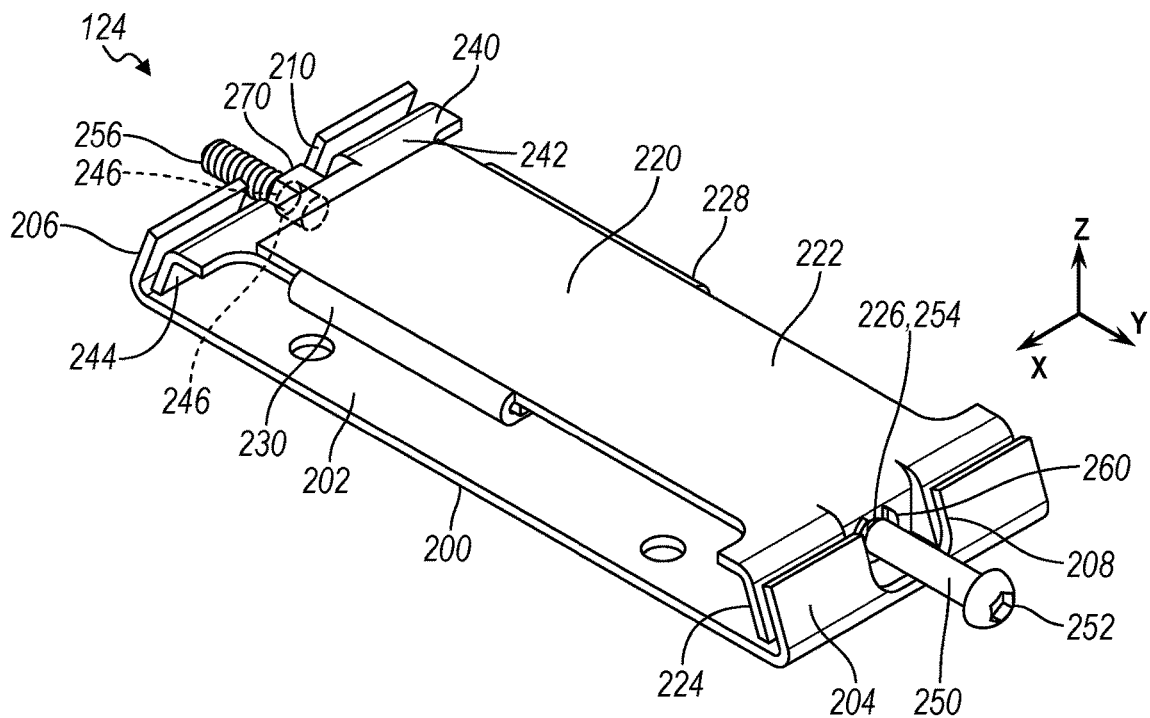
FIG. 4 is a perspective view of a locking mechanism for a retention assembly according to an embodiment.

FIG. 4 illustrates a locking mechanism 124 according to an example and for use with the assembly of FIG. 1. The locking mechanism 124 has a ground locking bracket 200 to mount to the ground surface or surface plate. The ground locking bracket 200 may be attached or fixed relative to the surface plate 114 using an adhesive, welding, or various fasteners. The ground locking bracket 200 has a ground plate 202 extending between first and second inclined flanges 204, 206.

The first and second inclined flanges 204, 206 may extend outwardly from the ground plate 202 and towards one another as shown. The first and second inclined flanges 204, 206 may each form a non-orthogonal or non-perpendicular angle with the ground plate 202. In one example, the first and second inclined flanges 204, 206 each form an acute angle with the ground plate 202. The first inclined flange 204 defines a slotted aperture 208 therethrough, and the second inclined flange 206 may also defined a slotted aperture 210 therethrough.

The locking mechanism 124 has a support bracket 220 that is supported by and extends from the lower surface 112 of the cover. The support bracket 220 may be the attached and fixed relative to the lower surface 112 of the cover. In various examples, the support bracket 220 may be attached to the lower surface 112 of the cover using an adhesive, welding, or various fasteners.

The support bracket 220 has a support plate 222 with a third inclined flange 224 extending from the support plate. The inclined flange 224 defines an aperture 226 therethrough. The support plate 222 is connected to the lower surface 112 of the cover. The support plate 222 also has first and second guide members 228, 230 extending outwardly from the plate 222 and form a C-shaped channel or the like.

The locking mechanism 124 has a sliding bracket 240 with a sliding plate 242 having a fourth inclined flange 244 extending from the sliding plate 242. The sliding plate 242 is received for translation by the first and second guide members 228, 230 of the support bracket, and is parallel with the support plate 222. The inclined flange 244 defines an aperture 246 therethrough that is along a common longitudinal axis, or y-axis, with the aperture 226.

The locking mechanism 124 has a first fastener 250. The fastener 250 may be a threaded fastener 250 that extends through the apertures 226, 246 of the support and sliding brackets, such that the fastener extends through the support and sliding brackets 220, 240. In other examples, the first fastener 250 may be provided by a cam, a spring pin member, or the like. The fastener 250 extends through the support and sliding brackets 220, 240 when the locking mechanism 124 is in a locked position as shown in FIG. 4, and also when the locking mechanism 124 is in an unlocked position and the ground bracket 200 is away from the remainder of the locking mechanism 124. The threaded fastener 250 has a head 252, and a threaded section 256. The threaded fastener 250 may additionally have one or more radial grooves 254. In the example shown, the fastener 250 has first and second radial grooves 254 that are axially spaced to be positioned on either side of the inclined flange 224. The radial grooves 254 each receive a locating member 260, such as a clip or circlip to axially locate and axially fix the fastener 250 relative to the support bracket 220. In the example shown first and second circlips 260 are provided on either side of the third inclined flange 224 and into the respective radial grooves 254 in the fastener 250.

The locking mechanism has a second fastener, or second threaded fastener 270. In one example, the second threaded fastener 270 is a locking nut 270 is connected to or embedded within the sliding bracket 240 and is co-axial with the aperture 246 and longitudinal axis. In alternative embodiments, the aperture 246 in the flange 244 may be threaded. The locking nut 270 receives the threaded end 256 of the fastener 250. When the fastener 250 is rotated, the axial position of the fastener 250 is fixed and the rotation causes the locking nut 270 to move along the threaded section 256 of the fastener 250, thereby moving the sliding bracket 240 relative to the support bracket 220. Rotation of the fastener 250 in a first direction moves or translates the third and fourth flanges 224, 244 towards one another. Rotation of the fastener 250 in a second, opposite direction moves or translates the third and fourth flanges 224, 244 away from one another.

Rotation of the fastener 250 therefore causes the sliding bracket 240 to translate relative to the support bracket to lock and unlock the locking mechanism 124.

The third and fourth inclined flanges 224, 244 may extend outwardly from their respective plates 222, 242 and away from one another as shown. The third inclined flange 224 may form a non-orthogonal or non-perpendicular angle with the support plate 222, and in one example as shown is an obtuse angle. The fourth inclined flange 244 may form a non-orthogonal or non-perpendicular angle with the sliding plate 242, and in one example and as shown is an obtuse angle. In other examples, the third and fourth inclined flanges 224, 244 may form an acute angle with their respective plates.

When the locking mechanism 124 is in the locked position, as shown in FIG. 4, movement of the base charging pad and cover 106 is prevented in the direction perpendicular to the ground surface 102, or the z-direction. In the locked position, as shown in FIG. 4, the first and the third inclined flanges 204, 224 may mate or cooperate with one another as shown, and the angles of the first and third flanges 204, 224 may be supplementary angles. Likewise, the second and the fourth inclined flanges 206, 244 may mate or cooperate with one another as shown, and the angles of the second and fourth flanges 206, 244 may be supplementary angles.

In the example shown, the third and fourth flanges 224, 244 are nested within the first and second flanges 204, 206 in the locked position. To unlock the locking mechanism 124, the fastener 250 is rotated to slide the sliding bracket 240 until a distance between the distal ends of the third and fourth flanges 224, 244 is less than a distance between the first and second flanges 204, 206 at their distal ends. The sliding and support brackets 240, 220 may then be lifted away from the ground locking bracket 200, with the fastener 250 lifting through the first and second slotted apertures 208, 210 in the ground locking bracket 200.

To lock the locking mechanism 124, the third and fourth flanges 224, 244 of the support and sliding brackets 220, 240 are inserted between the first and second inclined flanges 204, 206 of the ground locking bracket 200, with the fastener 250 fitting into the first and second slotted apertures 208, 210. The fastener 250 is then rotated to slide the sliding bracket 240 to move the third and fourth flanges 224, 244 away from one another until they mate or come into contact with the first and second inclined flanges 204, 206.

In another example, the first and second flanges 204, 206 may be provided at an obtuse angle relative to the ground plate 202, and the third and fourth flanges 224, 244 may each form an acute angle with their respective plate and extend towards one another. In this configuration, the first and second flanges would be nested within the third and fourth flanges when the locking mechanism 124 is in a locked position.

The support bracket 220 and the sliding bracket 240 may be positioned within a recessed pocket 280 defined by the lower surface 112 of the cover, with the ground locking bracket 200 also being received within the pocket 280 when the locking mechanism 124 is in an engaged position as shown in FIG. 4. The pocket 280 may be spaced apart from the pocket 147. In another example, the pockets 147, 280 may be part of a larger pocket region.

The cover 106 defines an access aperture 282 in the peripheral rim 118. A lower surface of the cover defines a linear recessed pocket 284 extending from the access aperture 282 in the rim to the recessed pocket 280 to allow access of a tool driver to the threaded fastener 250.

The access aperture 282, the linear recessed pocket 284, the first and second slotted apertures 208, 210 and the apertures 226, 246 in the third and fourth flanges 224, 244 may all be aligned along a common longitudinal axis coaxial with that of the threaded fastener 250 when the locking mechanism 124 in in the locked position.

In some examples, the threaded fastener 250 may be left-handed threaded, or require counterclockwise rotation to unlock the mechanism. In further examples, the head 252 of the threaded fastener 250 may be provided with a non-standard head pattern, such as a star pattern, security internal hex pattern, or the like. In other examples, the head 252 of the fastener 250 may be provided as an external hexagon pattern, or the like, and as a right-handed threaded fastener 250.

Figure 5:
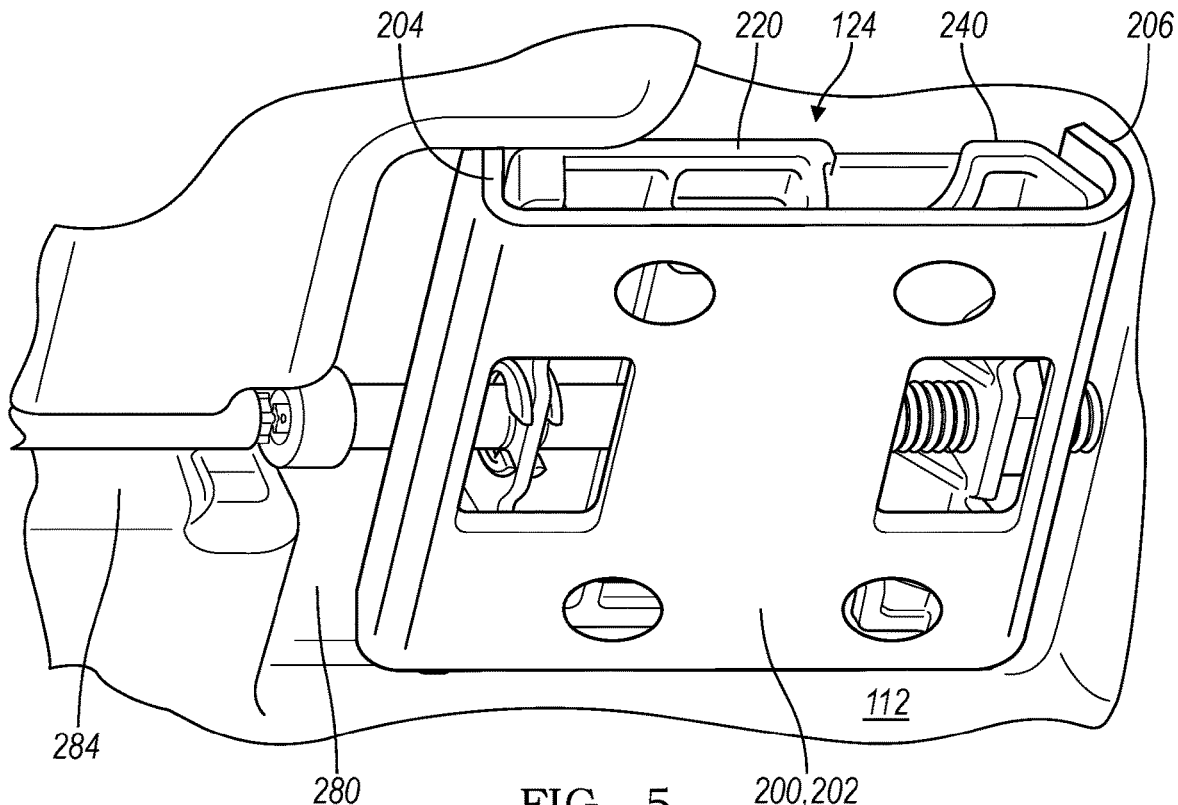
FIG. 5 is a perspective view of a locking mechanism for a retention assembly according to another embodiment.
Figure 6:
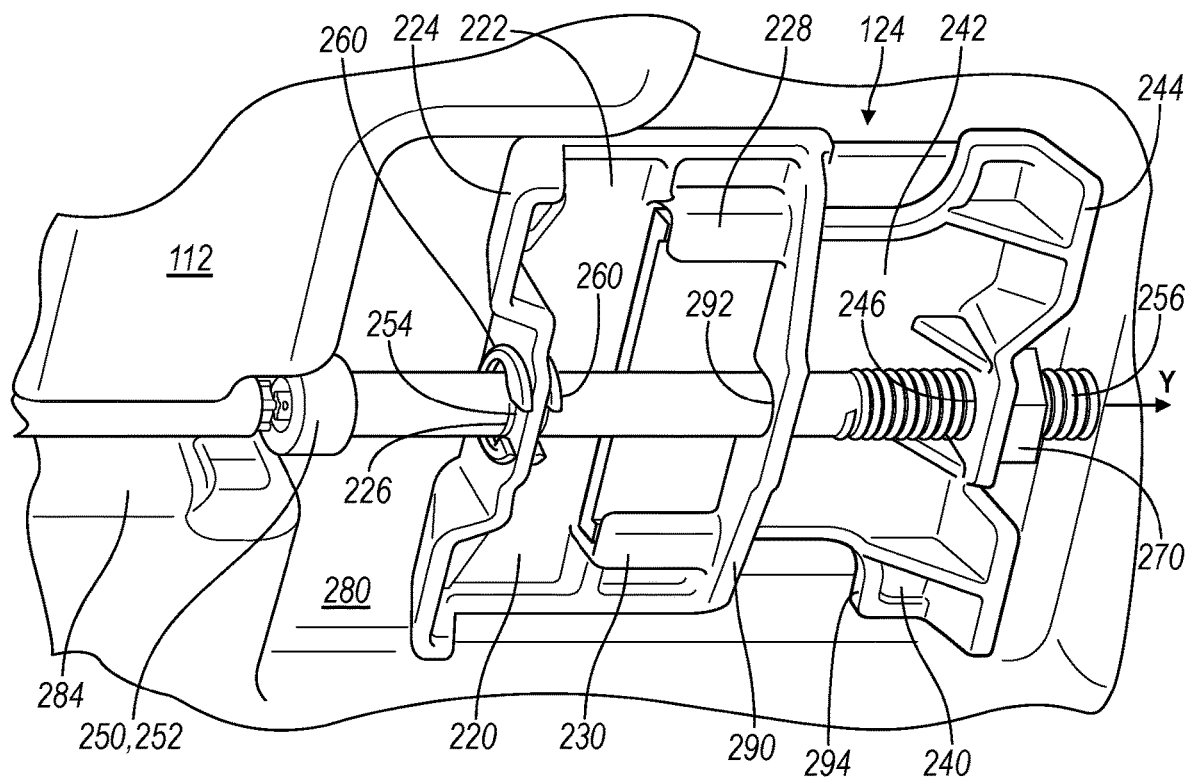
FIG. 6 is a partial perspective view of the locking mechanism of FIG. 5.

FIGS. 5 and 6 illustrate a locking mechanism 124 according to another example and for use with the assembly of FIG. 1. Elements that are the same as or similar to those described above with reference to FIG. 4 are given the same reference number for simplicity.

The support bracket 220 defines an intermediate support bridge 290 extending outwardly from the support plate 222. The intermediate support bridge 290 is positioned between the third and fourth inclined flanges 224, 244 and defines a guide aperture 292 therethrough. The threaded fastener 250 extends through the guide aperture 292. The intermediate support bridge 290 provides additional structural stability for the bracket and locking mechanism 124, and also may improve tracking and sliding motion of the sliding bracket 240.

As shown in FIG. 6, the apertures 226, 246 in the support bracket 220 and sliding bracket 240 may be provided adjacent to the third and fourth inclined flanges 224, 244, and furthermore, each of the third and fourth inclined flanges 224, 244 may be split into portions on either side of the respective aperture.

Additionally, the sliding bracket 240 may be provided with a surface 294 to act as a limit for retractive motion toward the support bracket 220, and interface with the guide members 228, 230 or in the intermediate support bridge 290 in the unlocked position.

Also, as shown in FIG. 6, the threaded section 256 of the fastener extends along only a portion of the length of the fastener 250 such that there is an unthreaded shank between the threaded section 256 and the head 252. The length of the threaded section 256 may additionally or alternatively be selected to limit the retractive motion of the sliding bracket 240 towards the support bracket 220.

Figure 7:
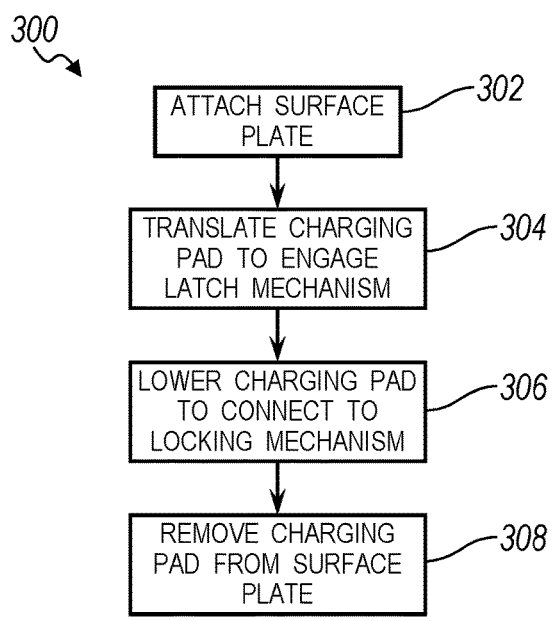
FIG. 7 is a flow chart for a method of positioning an assembly for charging a vehicle according to an embodiment.

FIG. 7 illustrates a method 300 of positioning the assembly 100 according to an example. In other examples, various steps may be omitted, added, rearranged into another order, or performed sequentially or simultaneously.

At step 302, a surface plate 114 is attached to an underlying ground surface 102, for example, via fasteners or mounts or using an adhesive. The surface plate 114 has the ground latch bracket 150 thereon as well as the locking mechanism 124 in an engaged position. The locking mechanism 124 on the surface plate 114 includes the ground locking bracket 200 connected to the surface plate, the support and sliding brackets 220, 240, and the threaded fastener 250 extending through the support bracket 220 and sliding bracket 240 and cooperating with the locking nut 270. The third and fourth inclined flanges are mated with the first and second inclined flanges, respectively, to prevent movement of the support bracket 220 in a direction perpendicular to the surface plate 114. An upper surface of the support bracket, or the face that mates with the lower surface of the cover is provided with an adhesive. In one example, the adhesive may already be provided on the supper face of the support bracket when the surface plate 114 is attached and have a protective backing film. In another example, the adhesive is applied after the surface plate 114 is attached.

At step 304, base charging pad in a cover 106 is laterally translated relative to the surface plate 114 such that a cover latch bracket 140 extending from the base charging pad is inserted between the ground latch bracket 150 and the surface plate 114. When the cover latch bracket 140 is inserted into the engaged position, movement of the base charging pad is prevented in the direction perpendicular to the surface plate 114.

At step 306, the base charging pad is then lowered such that the lower surface of the base charging pad contacts and adheres to the upper surface of the support bracket 220 of the locking mechanism 124 that has the adhesive thereon.

At step 308, the base charging pad is removed or uninstalled from the surface plate 114 by unlocking the locking mechanism 124. The threaded fastener 250 is rotated to move and retract the sliding bracket 240 relative to the support bracket 220 such that the locking mechanism 124 is in an unlocked position with the third and fourth inclined flanges spaced apart from the first and second inclined flanges, respectively. The base charging pad is lifted such that the ground locking bracket 200 is spaced apart from the support bracket 220 and sliding bracket 240, and is then laterally translated relative to the surface plate 114 such that the cover latch bracket 140 is withdrawn from between the ground latch bracket 150 and the surface plate 114.

While various embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. An assembly for charging a vehicle comprising:
   a ground latch bracket to mount to a ground surface;
   a charging pad contained within a cover;
   a cover latch bracket supported by a lower surface of the cover, to translate relative to the ground latch bracket to an engaged position, a portion of the ground latch bracket positioned between the cover latch bracket and the lower surface of the cover in the engaged position to prevent movement of the charging pad in a direction perpendicular to the ground surface; and
   a locking mechanism comprising:
      a ground locking bracket with a ground plate extending between first and second inclined flanges, the ground plate to mount to the ground surface,
      a support bracket with a third inclined flange extending from a support plate, the support plate supported by the lower surface of the cover, the support plate having first and second guide members extending therefrom,
      a sliding bracket having a fourth inclined flange extending from a sliding plate, the sliding plate received for translation by the first and second guide members,
      wherein the sliding bracket translates relative to the support bracket to lock and unlock the locking mechanism, wherein the third inclined flange mates with the first inclined flange and the fourth inclined flange mates with the second inclined flange when the locking mechanism is in a locked position to prevent movement of the charging pad in the direction perpendicular to the ground surface.

2. The assembly of claim 1 wherein the locking assembly further comprises:
   a first threaded fastener extending through the support bracket and the sliding bracket; and
   a second threaded fastener connected to the sliding bracket and receiving the first threaded fastener such that rotation of the first threaded fastener translates the sliding bracket translates relative to the support bracket to lock and unlock the locking mechanism.

3. The assembly of claim 2 wherein the first and second inclined flanges of the ground locking bracket each define a slotted aperture therethrough
   wherein the first threaded fastener is a bolt; and
   wherein the second threaded fastener is a locking nut; and
   wherein the first threaded fastener is threaded such that counterclockwise rotation of the fastener causes the sliding bracket to translate towards the support bracket.

4. The assembly of claim 2 wherein the locking mechanism further comprises at least one locating member interfacing with the first threaded fastener and the support bracket to axially locate the first threaded fastener relative to the support bracket.

5. The assembly of claim 4 wherein the first threaded fastener defines first and second radial grooves; and
   wherein the at least one locating member comprises first and second clips positioned within the first and second radial grooves, respectively, with the support bracket positioned between the first and second clips.

6. The assembly of claim 2 wherein the support bracket defines an intermediate support bridge extending outwardly from the support plate, the intermediate support bridge positioned between the third and fourth inclined flanges and defining a guide aperture therethrough, the first threaded fastener extending through the guide aperture.

7. The assembly of claim 1 wherein the first and second inclined flanges extend outwardly from the support plate and towards one another.

8. The assembly of claim 1 wherein the first and third inclined flanges have supplementary angles; and
   wherein the second and fourth inclined flanges have supplementary angles.

9. The assembly of claim 1 wherein the lower surface of the cover defines a first recessed pocket, the support bracket and the sliding bracket positioned within the first recessed pocket;
   wherein the cover defines an outer peripheral rim extending towards the ground surface, the rim defining an access aperture; and
   wherein the lower surface of the cover defines a linear recessed pocket extending from the access aperture in the rim to the first recessed pocket to allow access of a tool driver to the threaded fastener.

10. The assembly of claim 9 wherein the lower surface of the cover defines a second recessed pocket spaced apart from the first recessed pocket, the cover latch bracket positioned within the second recessed pocket.

11. The assembly of claim 1 wherein the charging pad is secured to the ground surface when the cover latch bracket is the engaged position and the locking mechanism is in the locked position such that the charging pad is constrained in at least three degrees of translational freedom.

12. The assembly of claim 1 wherein the cover latch bracket defines an upper face extending parallel to the ground surface; and
    wherein the ground latch bracket defines a lower face extending parallel to the ground surface, the upper face and the lower face facing one another in the engaged position.

13. The assembly of claim 1 further comprising a surface plate providing the ground surface;
    wherein the charging pad comprises a wireless transmitter to communicate with a wireless receiver mounted in an electric vehicle when the electric vehicle is positioned over the charging pad for inductive charging.

14. The assembly of claim 1 wherein the cover latch bracket comprises an intermediate member positioned between and connecting first and second legs, one of the first and second legs connected to the lower surface of the cover; and
    wherein the ground latch bracket further comprises a central plate portion spaced apart from the ground surface and connected to the ground surface at opposed ends, the central plate portion received between the first and second legs in the engaged position.

15. The assembly of claim 1 wherein the ground latch bracket further comprises a central plate portion positioned between opposed ends, the central plate portion spaced apart from the ground surface, the ground latch bracket connected to the ground surface by the opposed ends; and
    wherein the lower surface of the cover forms the cover latch bracket as a tab extending outwardly therefrom, the tab received between the central plate portion and the ground surface in the engaged position.

16. A retention assembly for a charging station for a vehicle, the retention assembly comprising:
a ground latch bracket to mount to a ground surface and receive a cover latch bracket extending from a lower surface of a cover of a charging pad, the ground latch bracket positioned between the cover latch bracket and the lower surface in an engaged position; and
a locking mechanism comprising:
a ground locking bracket with a ground plate extending between first and second inclined flanges, the ground plate to mount to the ground surface,
a support bracket with a third inclined flange extending from a support plate, the support plate to connect to the lower surface of the cover, the support plate having first and second guide members extending therefrom,
a sliding bracket having a fourth inclined flange extending from a sliding plate, the sliding plate received for translation by the first and second guide members such that the sliding bracket to translate relative to the support bracket to lock and unlock the locking mechanism, wherein the third inclined flange mates with the first inclined flange and the fourth inclined flange mates with the second inclined flange when the locking mechanism is in a locked position.

17. The retention assembly of claim 16 further comprising the cover latch bracket to connect to a lower surface of a cover of a charging pad and translate relative to the ground latch bracket to the engaged position.

18. The retention assembly of claim 16 wherein the locking mechanism further comprises:
a first threaded fastener extending through the support bracket and the sliding bracket,
at least one locating member interfacing with the first threaded fastener and the support bracket to axially locate the first threaded fastener relative to the support bracket,
a second threaded fastener connected to the sliding bracket and receiving the first threaded fastener such that rotation of the first threaded fastener translates the sliding bracket translates relative to the support bracket to lock and unlock the locking mechanism.

19. A method of positioning an assembly for charging a vehicle, the method comprising:
providing a ground latch bracket on a surface plate;
providing a locking mechanism in an engaged position on the surface plate, the locking mechanism with a ground locking bracket connected to the surface plate with first and second inclined flanges, a support bracket with a third inclined flange, and a sliding bracket received for translation by the support bracket with a fourth inclined flange, wherein the third and fourth inclined flanges are mated with the first and second inclined flanges in the engaged position, respectively, to prevent movement of the support bracket in a direction perpendicular to the surface plate,
applying adhesive to an upper surface of the support bracket;
attaching the surface plate to an underlying ground surface;
laterally translating a charging pad relative to the surface plate such that a cover latch bracket extending from the charging pad is inserted between the ground latch bracket and the surface plate thereby preventing movement of the charging pad in the direction perpendicular to the surface plate; and
lowering the charging pad such that a lower surface of the charging pad adheres to the upper surface of the support bracket of the locking mechanism.

20. The method of claim 19 further comprising removing the charging pad from the surface plate by (i) translating the sliding bracket relative to the support bracket such that the locking mechanism is in a disengaged position with the third and fourth inclined flanges spaced apart from the first and second inclined flanges, respectively, (ii) lifting the charging pad such that the ground locking bracket is spaced apart from the support bracket and sliding bracket, and (iii) laterally translating the charging pad relative to the surface plate such that the cover latch bracket is withdrawn from between the ground latch bracket and the surface plate.

* * * * *